United States Patent [19]

Hiramatsu et al.

[11] Patent Number: 4,919,248
[45] Date of Patent: Apr. 24, 1990

[54] DRIVE COUPLING UNIT

[75] Inventors: Takeo Hiramatsu, Nagaokakyo; Kenjiro Fujita, Kusatsu; Yoshimasa Nagayoshi, Kyoto; Shuzo Hirakushi; Yoshiaki Hamasaki, both of Osaka, all of Japan

[73] Assignees: Mitsubishi Jidosha Kogyo Kabushiki Kaisha, Tokyo; Koyo Seiko Kabushiki Kaisha, Osaka, both of Japan

[21] Appl. No.: 272,417

[22] Filed: Nov. 17, 1988

[30] Foreign Application Priority Data

Dec. 8, 1987 [JP] Japan ................ 62-310472
Mar. 31, 1988 [JP] Japan ................ 63-78920

[51] Int. Cl.⁵ ................ B60K 17/34; F01C 21/00
[52] U.S. Cl. ................ 192/61; 192/58 R; 180/248; 418/180
[58] Field of Search ............. 192/58 R, 61; 180/248; 418/15, 173, 180

[56] References Cited

U.S. PATENT DOCUMENTS

| | | | |
|---|---|---|---|
| 2,969,021 | 1/1961 | Menon | 418/15 X |
| 4,256,443 | 3/1981 | Kunze et al. | 418/180 X |
| 4,468,180 | 8/1984 | Shibuya | 418/15 |
| 4,566,869 | 1/1986 | Pandeya et al. | 418/15 |
| 4,676,336 | 6/1987 | Hiramatsu et al. | 180/248 X |

Primary Examiner—Randolph A. Reese
Assistant Examiner—J. Russell McBee

[57] ABSTRACT

In a drive coupling unit suitable for use in an four-wheel drive unit for motor vehicles of the type wherein a torque is transmitted via a fluid pressure produced depending on a difference in rotational speed between two rotating shafts, each working fluid supply passage and a corresponding check valve disposed therein are arranged to interconnect one of two intake/discharge ports in each respective pump chamber with a tank in which a working fluid is retained. With this construction, an improved response characteristic of the check valves and a substantial reduction of the overall size of the drive coupling unit can be attained.

2 Claims, 8 Drawing Sheets

DRIVE COUPLING UNIT

BACKGROUND OF THE INVENTION

1. Field of the Invention

The present invention relates to drive coupling units for transmitting a torque via a fluid pressure produced dependent on a difference in rotational speed between two rotating shafts, and more particularly to a drive coupling unit suitable for use in a four-wheel drive unit for motor vehicles.

2. Description of the Prior Art

In a four-wheel drive vehicle in which front wheels and rear wheels are commonly driven by a single engine, it may occur that the effective turning radius differs slightly between the front wheels and the rear wheels, and the rolling path differs not only between the right and left wheels but also between the front and rear wheels when the vehicle is turning a corner, for instance. Since those differences occurring between the front and rear wheels are permitted by a differential unit, a full-time four-wheel drive vehicle is equipped with a center differential unit disposed between the front wheels and the rear wheels.

The center differential unit, however, cannot easily be constructed compactly and hence increases the weight and the manufacturing cost of a vehicle body. Furthermore, the center differential unit requires an additional component such as a differential lock mechanism for maintaining a four-wheel drivability. Such additional component enlarges the overall construction of the central differential unit.

With the foregoing difficulties in view, there have been proposed drive coupling units so constructed as to optionally transmit a torque from the front wheel side to the rear wheel side via a fluid pressure instead of the center differential unit.

The proposed drive coupling units comprise a drive rotating shaft disposed at a front wheel side connected with an engine, a driven rotating shaft disposed at a rear wheel side, and a working fluid acting on the drive and driven rotating shafts for producing a fluid pressure (or fluid resistance) dependent on a difference in rotational speed between the drive and driven rotating shafts, thereby optionally transmitting a torque to the rear wheel side.

FIG. 6 of the accompanying drawings diagrammatically shows the general construction of a vehicle driving system incorporating the conventional drive coupling unit stated above. The driving system includes a transversely installed engine 1 connected with a transmission 2 having an output shaft 2a on which is mounted a drive gear (or a fourth-speed counter gear) 2b coupled with a drive coupling unit 5.

The drive coupling unit 5 is mounted in a transmission case and includes, as shown in FIGS. 6 and 7, a cam ring 51 and a rotor 52 received in the cam ring 51, the cam ring 51 having on its outer periphery a cam ring gear 53 (FIG. 6). The can ring 51 is connected with the output shaft 2a through a meshing engagement between the cam ring gear 53 and the drive gear 2b.

The cam ring 51 is connected with a first rotating shaft 55 which is composed of a tubular outer shaft carrying thereon a gear 54. The gear 54 is held in mesh with a differential unit 6 so that the cam ring 51 is connected with front wheels 3, 3 through the gear 54 and the differential unit 6.

The rotor 52 is connected with an inner shaft (second rotating shaft) 56 extending through the tubular first rotating shaft 55 and connected via a bevel gear mechanism 7a to the front end of a propeller shaft 8. The rear end of the propeller shaft 8 is connected via a bevel gear mechanism 7b to a differential unit 9 to which axles of the respective rear wheels 4, 4 are connected.

With this construction, a driving force from the engine 1 is transmitted to the front wheels 3, 3 successively through the engine output shaft 2a, the cam ring 51, the first rotating shaft 55 and the gear 54 of the drive coupling unit 5, and the differential unit 6, while at the same time the engine driving force is optionally transmitted through the drive coupling unit 5 to the rear wheels 4, 4.

The drive coupling unit 5, as schematically shown in cross section in FIG. 7, includes the cam ring 51, the rotor 52 connected with the second rotating shaft 56 and rotatably disposed in the cam ring 51, and a multiplicity of radial sliding vanes 57 carried on an outer peripheral surface of the rotor 52 and held in sliding contact with an inner peripheral surface of the cam ring 51.

The vanes 57 are slidably received in corresponding radial slots 58 formed in the rotor 52 and hence they are movable in radial directions to project from and retract into the radial slots 58. Each of the radial slots 58 has an enlarged inner end portion 59 communicating with a pressure chamber 60.

The cam ring 51 and the rotor 52 define therebetween a plurality of pump chamters 61, 62, 63, each pump chamber 61, 62, 63 having at its opposite ends a pair of intake/discharge ports 61a, 61b; 62a, 62b; 63a, 63b. The pump chamber 61, 62, 63 is divided by the vanes 57 into a discharge side compartment and an intake side compartment. The pump chambers 61–63 are filled with a working oil.

The intake/discharge ports 61a, 62a, 63a are communicated with each other by a first oil passage (first working fluid flow passage) 64 while the intake/discharge ports 61b, 62b, 63b are communicated with each other by a second oil passage (second working fluid flow passage) 65.

The first and second oil passages 64, 65 are communicated together via an oil passage 66 in which an orifice 67 is disposed. The first and second oil passages 64, 65 are further communicated with an oil reservoir 70, respectively, through oil passages (working fluid supply passages) 68, 69 for supplying therethrough the working oil from the oil reservoir 70 to the pump chambers 61–63.

The first and second oil passages 64, 65 are further communicated with the pressure chamber 60 through oil passages 71, 72. Each of the oil passages 68, 69, 71, 72 has a check valve 73–76.

With this arrangement, when the first rotating shaft 55 and the second rotating shaft 56 creates a difference in rotational speed therebetween, the rotor 52 starts rotating relative to the cam ring 51.

For example, when the rotor 52 turns counterclockwise in FIG. 7 relative to the cam ring 51, the vanes 57 force or drive the working oil into the respective pump chambers 61–63 in which instance first sides of the individual pump chambers 61–63, in which the intake/discharge ports 61a–63a are disposed in front of the vanes 57, constitute discharge side compartments, whereas second sides of the individual pump chambers 61–63, in which the intake/discharge ports 61b–63b are disposed in the rear of the vanes 57, constitute intake side compartments.

A pumping action produced by the vanes 57 causes the working oil to be discharged from the intake/discharge ports 61a-63a, now acting as discharge ports, to the first oil passage 64 from which the working oil flows successively through the oil passage 65 and the second oil passage 65, then is drawn from the intake/discharge ports 61b-63b, now acting as intake ports, into the pump chambers 61-63, the direction of flow of the working oil being indicated by arrows in FIG. 7.

The working oil, as it flows through the orifice 67 in the oil passage 66, is subjected to a resistance acting in a direction to prevent the rotor 52 from rotating relative to the cam ring 51. The magnitude of the resistance is proportional to the amount of flow of the working oil.

Thus, the rotor 52 and the cam ring 51 are controlled by the action of the working oil in such a manner as to reduce the difference in rotational speed between the rotor 52 and the cam ring 51. For instance, when the cam ring 51 tends to rotate in excess relative to the rotor 52, a portion of the rotating torque is also transmitted to the rotor 52 via the working oil.

By the action of the drive coupling unit 5, the torque from the engine 1 can be transmitted to the front wheels 3, 3 and the rear wheels 4, 4 at such a proper distribution ratio that the front wheels 3, 3 and the rear wheels 4, 4 are driven to rotate substantially at the same speed. A four-wheel driving condition is thus achieved.

As a result, in the normal cruising condition where the slip of the front wheels 3, 3 is very small, the driving torque from the engine 1 is transmitted mainly to the front wheel side, while at the same time it occurs little or substantially no torque transmission to the rear wheel side.

On the other hand, the slip of the front wheels 3, 3 becomes large when the vehicle is running on a low friction surface such as a sandy land. In this instance, the torque from the engine 1 is transmitted to the front wheel side and the rear wheel side at a proper torque distribution ratio. With this torque distribution, the slip of the front wheels 3, 3 in reality is restricted to the least, thus ensuring that the vehicle while being driven by four wheels runs stably on such a low friction surface without causing undue slip of the front wheels.

The working oil discharged in the first oil passage 64 or the second oil passage 65 is pressurized and a portion of such pressurized working oil is then supplied through the oil passage 71 or the oil passage 72 to the pressure chamber 60. During that time, the check valve 75 or 76 permits the pressurized working oil to flow into the pressure chamber 60 while preventing the reverse flow of the pressurized working oil from the pressure chamber 60 toward the first oil passage 64 or the second oil passage 65. The pressure chamber 60 is therefore maintained at a pressure above a predetermined value with the result that the pressurized working oil acts on the inner ends of the respective sliding vanes 57, urging the sliding vanes 57 radially outwardly into pressure contact with the cam ring 51, thus providing an enhanced fluid-tightness.

The working oil may leak from a seal portion in the cam ring 51 or the rotor 52. When such leakage takes place, an adequate amount of working oil will be supplied from the oil reservoir 70.

In the drive coupling unit 5 of the foregoing construction, the difference in rotational speed between the first rotating shaft 55 and the second rotating shaft 56 is related to the transmitting torque (differential limiting torque) between the first and second rotating shafts 55, 56, as indicated by a solid line in FIG. 8. As appears clear from the same figure, the transmitting torque increases progressively with an increase in differential rotational speed. This drive coupling unit has a large torque transmitting (differential limiting) capability and generates only a small amount of heat as compared with another conventional unit used for full-time four-wheel driving, such as a viscous coupling. A full-time four-wheel drive vehicle having the aforesaid drive coupling unit has an improved on-demand four-wheel drivability which is a necessary capability of transmitting the engine torque to the rear wheel side on demand, and hence is capable of considerably reducing the possibility of occurring a tight braking phenomenon.

In the conventional drive coupling unit 5 stated above, the discharge side compartments in the respective pump chambers 61-63 and the intake side compartments in the respective pump chambers 61-63 are connected to the oil reservoir 70 respectively through the two oil passages 68, 69 each of which serves to provide a plurality (three being shown here) of discharge side compartments or intake side compartments with a supply of working oil. The oil passages 68, 69 are relatively long and hence have a relatively large flow resistance. For reliable supply of the working oil, it is necessary to increase or enlarge the cross-sectional area of the oil passages 68, 69. With this enlargement of cross-sectional area, it becomes necessary to provide large check valves 73, 74 in the thus-enlarged oil passages 68, 69. The large check valves 73, 74 are difficult to operate in immediate response to a change in the direction of flow of the working oil in the oil passages 68, 69 when the direction of rotation of the rotor 52 relative to the cam ring 51 is changed, thus lowering the overall performance of the drive coupling unit. Further, the drive coupling unit having such large check valves 73, 74 is also large in size as a whole.

SUMMARY OF THE INVENTION

With the foregoing difficulties in view, it is an object of the present invention to provide a drive coupling unit incorporating structural features which improve the response of check valves, thereby providing an improved performance of the drive coupling unit and also contributing to the reduction of the overall size of the drive coupling unit.

According to the present invention, there is provided a drive coupling unit comprising: a cam ring connected to a first rotating shaft; a rotor connected to a second rotating shaft and rotatably disposed in the cam ring so as to define therebetween a plurality of pump chambers; a multiplicity of sliding vanes mounted on an outer peripheral surface of the rotor and slidably engaging an inner peripheral surface of the cam ring so as to divide each of the pump chambers into a discharge side compartment and an intake side compartment; a working fluid filled in the pump chambers for being compressed in the discharge side compartment and then circulated into the intake side compartment in each of the pump chamber as the cam ring and the rotor are rotated relative to one another due to a difference in rotational speed between the first rotating shaft and the second rotating shaft; an orifice disposed in a working fluid flow passage interconnecting the discharge side compartment and the intake side compartment in each of the pump chambers; a tank storing therein the working fluid; a pair of working fluid supply passages extending between the tank and each of the pump chambers for supplying the working fluid therethrough from the tank optionally to a pair of intake/discharge ports defined at opposite ends of the pump chamber; and a pair of check valves disposed in the working fluid supply passages, respectively, whereby each intake/discharge port is communicated with the tank through a corresponding one of the working fluid supply passages and a corresponding one of the check valves. Preferably, the drive coupling unit includes a first connecting passage interconnecting those intake/discharge ports which constitute intake ports in the respective pump chambers, and a second connecting passage interconnecting the remaining intake/discharge ports which constitute discharge ports in the respective pump chambers.

The drive coupling unit of the foregoing construction is advantageous in that since each individual working fluid supply passage and the corresponding one check valve are provided to interconnect the tank and one of two intake/discharge ports in each pump chamber, the check valve is operative in immediate response to a change in direction of flow of the working fluid, thereby improving the performance of the drive coupling unit and further contributing to the overall structural compactness of the drive coupling unit.

Furthermore, owing to the provision of the first and second connecting passages, the pressure of the working fluid is kept stable against fluctuation which would otherwise produce undesired vibration and noise in the power transmission system.

Many other advantages and features of the present invention will become manifest to those versed in the art upon making reference to the detailed description and the accompanying sheets of drawings in which preferred structural embodiments incorporating the principles of the present invention are shown by way of illustrative example.

DESCRIPTION OF THE PREFERRED EMBODIMENTS

Figure 1:
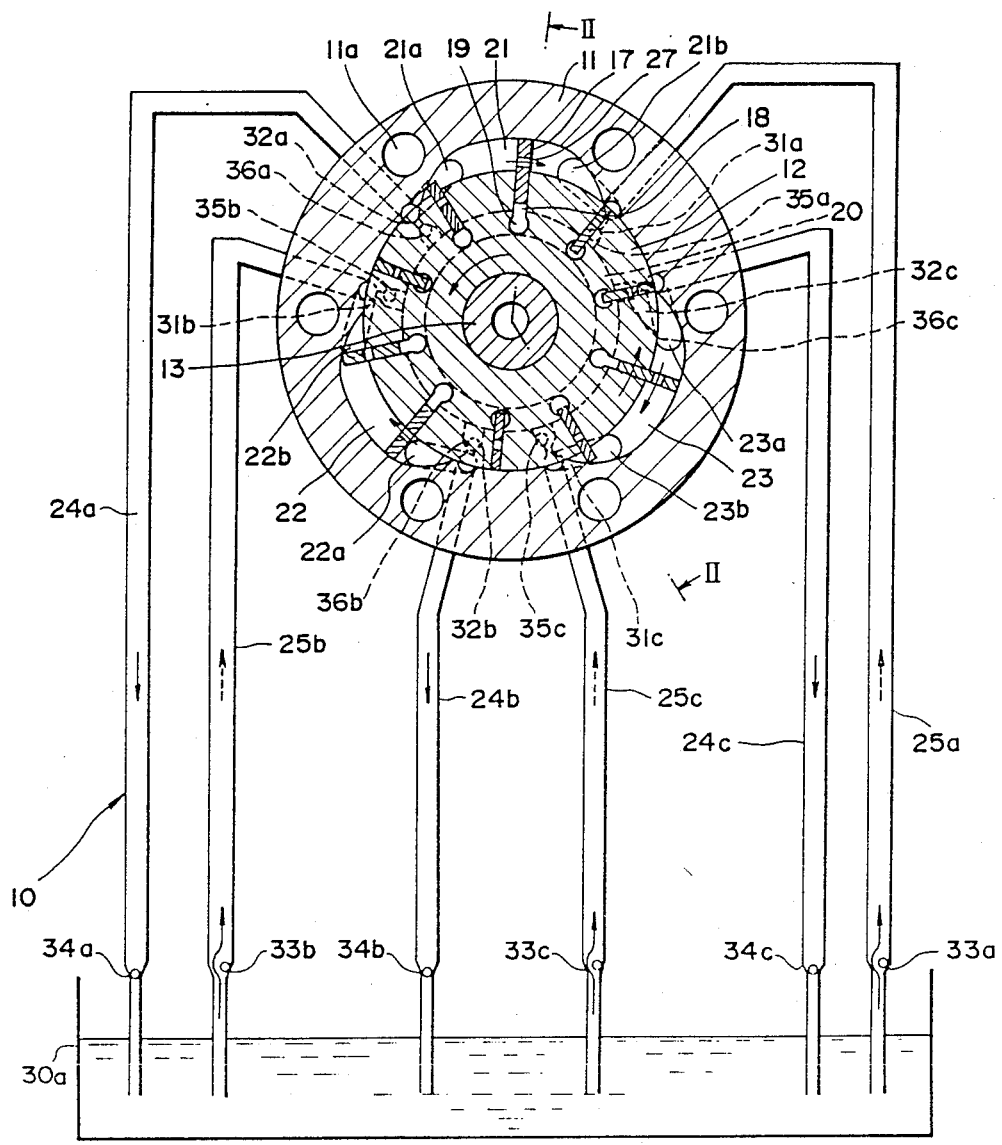
FIG. 1 is a diagrammatical view showing an arrangement of working fluid flow passages in a first embodiment of drive coupling unit according to the present invention.

Certain preferred embodiments of the present invention will be described herein below in greater detail with reference to FIGS. 1-5 of the accompanying drawings, in which like or corresponding parts are denoted by like or corresponding reference characters throughout several views.

Figure 2:
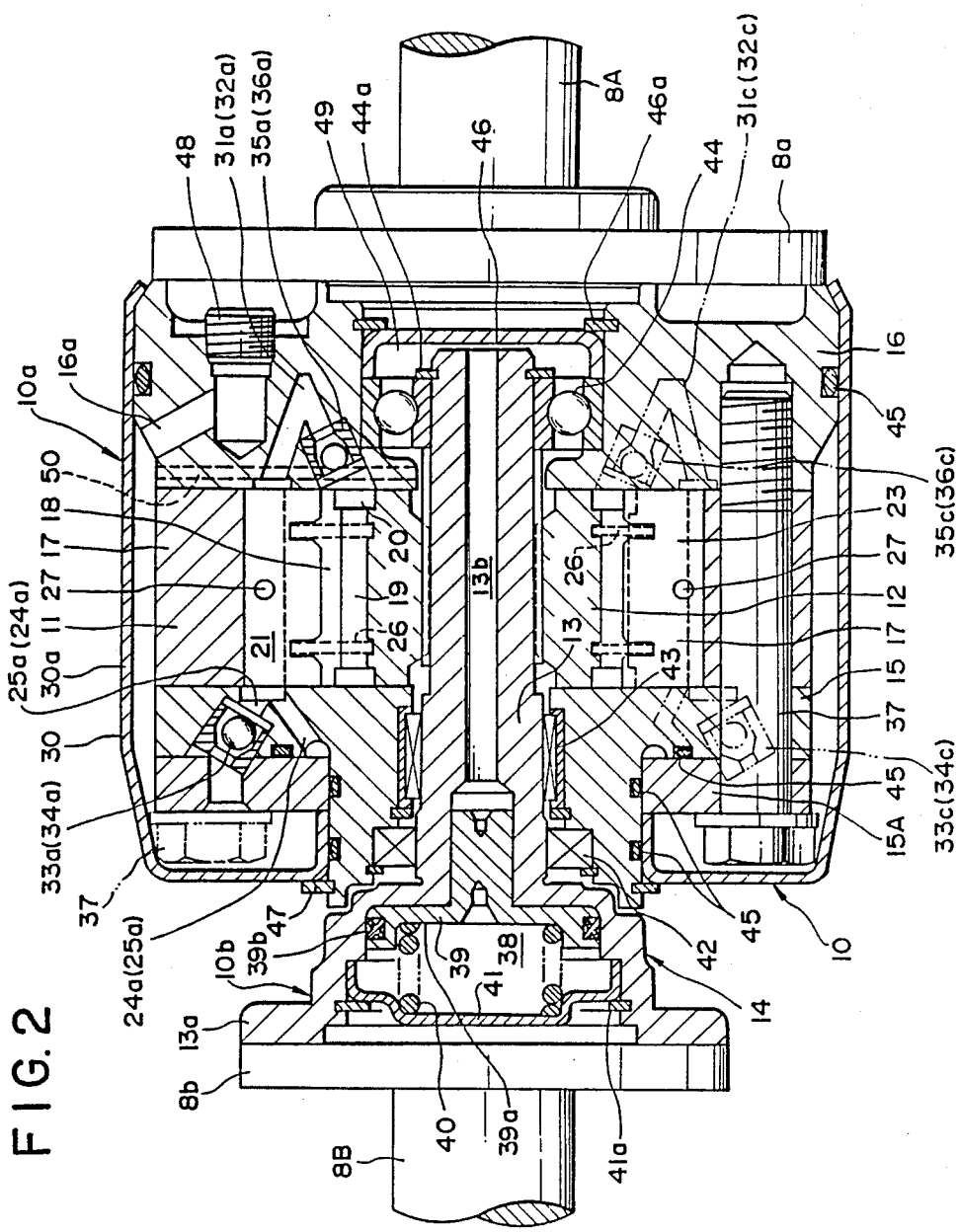
FIG. 2 is a longitudinal cross-sectional view taken along line II—II of FIG. 1.

Referring now to FIG. 2, there is shown a drive coupling unit 10 according to a first embodiment of the present invention. The drive coupling unit 10 is disposed between a first rotating shaft 8A and a second rotating shaft 8B and includes a cam ring side portion or assembly 10a rotatable in unison with the first rotating shaft 8A and a rotor side portion or assembly 10b rotatable in unison with the second rotating shaft 8B.

The cam ring assembly 10a includes a cam ring 11, two end housings 15, 16 connected to opposite ends of the cam ring 11, a spacer 15A connected to the end housing 15, and a cover member 30 provided to enclose or cover all of the cam ring 11, the end housings 15, 16 and the spacer 15A.

The spacer 15A, the end housing 15, the cam ring 11 and the end housing 16 are joined together by a plurality of screws 37 threaded successively through the spacer 15A, the end housing 15 and the cam ring 11 into the end housing 16. The end housing 16 is connected to an end flange 8a of the first rotating shaft 8A.

The cover member 30 is firmly retained in position against displacement by means of a stop ring 47 while its opposite end portions are being fitted respectively over the end housings 15, 16. The cover member 30 defines, jointly with internal components including the cam ring 11, the end housings 15, 16 and the spacer 15A, an annular space or tank 30a in which a working oil serving as a working fluid is sealingly stored.

Adjacent ones of the foregoing components are sealed by a plurality of seal members 45.

The end housing 16 has an oil passage 16a opening at one end with the tank 30a for supplying therethrough the working oil into the tank 30a. After the working oil supplying operation has completed, the other end of the oil passage 16a is closed by a taper plug 48.

The rotor assembly 10b includes a rotor 12, a shaft member 13 spline-coupled with the rotor 12, a piston 39 slidably fitted in an end of the shaft member 13 for taking up a volumetric change, and a compression coil spring 40 acting on the piston 39 to urge the same in one direction.

The shaft member 13 rotatably carries thereon the end housings 15, 16 via a pair of bearings 43, 44 interposed respectively between the shaft member 13 and the end housing 15 and between the shaft member 13 and the end housing 16. The shaft member 13 and the end housings 15, 16 jointly define therebetween an elongated oil chamber 49 sealingly closed at its opposite ends by a seal member 42 and a cover member 46, the cover member 46 having a sealing function.

The seal member 42 and the bearings 43, 44 are secured respectively by stop rings 42a, 43a, 44a to the shaft member 13 while the cover member 46 is secured by a stop ring 46a to the end housing 16.

The rotor 12 and the cam ring 11 extending therearound define therebetween a plurality (three in the illustrated embodiment) of pump chambers 21, 22, 23. As shown in FIG. 1, the cam ring 11 has in its inner peripheral surface three recessed portions spaced at circumferential distances. The recessed portions are closed jointly by inner end faces of the end housings 15, 16 and an outer peripheral surface of the rotor 12, thereby defining three oil chambers 21-23 which serve as pump chambers. In FIG. 2, the tank 30a and respective oil passages communicating therewith are shown, for clarity, as disposed outside of a body of the drive coupling unit 10.

The pump chambers 21-23 house therein a plurality of sliding vanes 17, as shown in FIGS. 1 and 2. The vanes 17 divide each pump chamber 21-23 into a discharge side compartment and an intake side compartment.

These vanes 17 are slidably received in a corresponding number of radial slots 18 formed in the rotor 12. The vanes 18 are held in sliding contact with the inner peripheral surface of the cam ring 11. In the illustrated embodiment, each vane 17 is urged radially outwardly by a pair of springs 26. The vane 17 has an orifice 27 defined in an upper portion of the vane 17 and communicating at opposite ends to the discharge side compartment and the intake side compartment.

The radial slots 18 in the rotor 12 have enlarged cylindrical inner end portions 19, respectively, which are connected together by an annular pressure chamber 20 defined by and between the rotor 12 and the end housing 15.

The pump chambers 21-23 have at opposite ends thereof a pair of intake/discharge ports 21a, 21b; 22a, 22b; 23a, 23b. The intake/discharge ports 21a-23b are separated by the vanes 17 and constitute discharge ports when they are disposed in the discharge side chambers. Conversely, when the intake/discharge ports 21a-23b are disposed in the intake side chambers, they serve as intake ports.

The tank 30a and individual intake/discharge ports 21a-23b in the respective pump chambers 21-23 are communicated with each other by six working fluid supply passages (hereinafter referred to as "oil passages") 24a-24c, 25a-25c and a corresponding number of check valves 34a-34c, 33a-33c disposed respectively in the oil passages 24a-24c, 25a-25c.

The end housings 15, 16 and the spacer 15A have formed therein those oil passages 24a, 25a, 24b, 25b, 24c, 25c which connect the intake/discharge ports 21a, 21b, 22a, 22b, 23a, 23b, respectively, in the pump chambers 21-23 to the tank 30a and also have formed therein the oil passages 31a, 32a, 31b, 32b, 31c, 32c which connect the individual intake/discharge ports 21a, 21b, 22a, 22b, 23a, 23b to the pressure chamber 20. The oil passages 24a, 25a, 24b, 25b, 24c 25c, 31a, 32a, 31b, 32b, 31c, 32c are provided with the corresponding check valves 34a, 34b, 34c, 33a, 33b, 33c, 35a, 35b, 35c, 36a, 36b, 36c.

In FIG. 1, the oil passages 24a, 25a, 24b, 25b, 24c, 25c and the tank 30a are shown as separated outwardly from the cam ring 11 for purposes of illustration. In reality, the tank 30a is defined along the outer periphery of the cam ring 11 and the end housings 15, 16, as shown in FIG. 2. Likewise, the oil passages 24a-25c are formed in the end housing 15 and the spacer 15A and extend only over a very short distance to interconnect the tank 30a and the pump chambers 21-23.

The shaft member 13 has at its one end a flanged portion 13a connected with an end flange 8b of the second rotating shaft 8B. The flange portion 13a defines therein a piston chamber 38 in which a volumetric change take up mechanism 14 is disposed. The volumetric change take up mechanism 14 is composed of the volumetric change take up piston 39 and the spring 40 stated above.

The shaft member 13 has a central axial hole 13b extending longitudinally therethrough and opening at its one end with the oil chamber 49. The other end of the axial hole 13b is enlarged to such an extent to form the piston chamber 38. The piston 39 is slidably received in the piston chamber 38 and normally urged by the spring 40 toward the aforesaid one end of the axial hole 13b.

The piston chamber 38 has an enlarged end closed by a retainer 41 attached thereto by a stop ring 41a. The piston 39 has in its rear end surface a circular recess 39a in which one end of the spring 40 is fitted, the other end of the spring 40 being held by the retainer 41. The piston 39 is equipped with a seal member 39b for providing a hermetic seal between the piston 39 and the piston chamber 38.

The oil chamber 49 and the tank 30a communicate with each other through an oil passage 50 which is formed to provide a pressure equilibrium between the oil chamber 49 and the tank 30a.

The working oil supplied through the oil passage 16a into the tank 30a is sealingly retained in the tank 30a. Since the working oil while being supplied is pressurized at a predetermined value, the piston 39 is normally retracted to a certain adequate extent by the thus-pressurized working oil against the force of the spring 40. In a condition shown in FIG. 1, the pressure of the working oil is lowered to the minimum and hence the piston 39 is disposed in its fully extended position under the force of the spring 40.

The drive coupling unit 10 of the foregoing construction is installed in a motor vehicle at a position between the front wheel side and the rear wheel side of the motor vehicle for enabling the motor vehicle to drive in a four-wheel drive mode.

Figure 3:
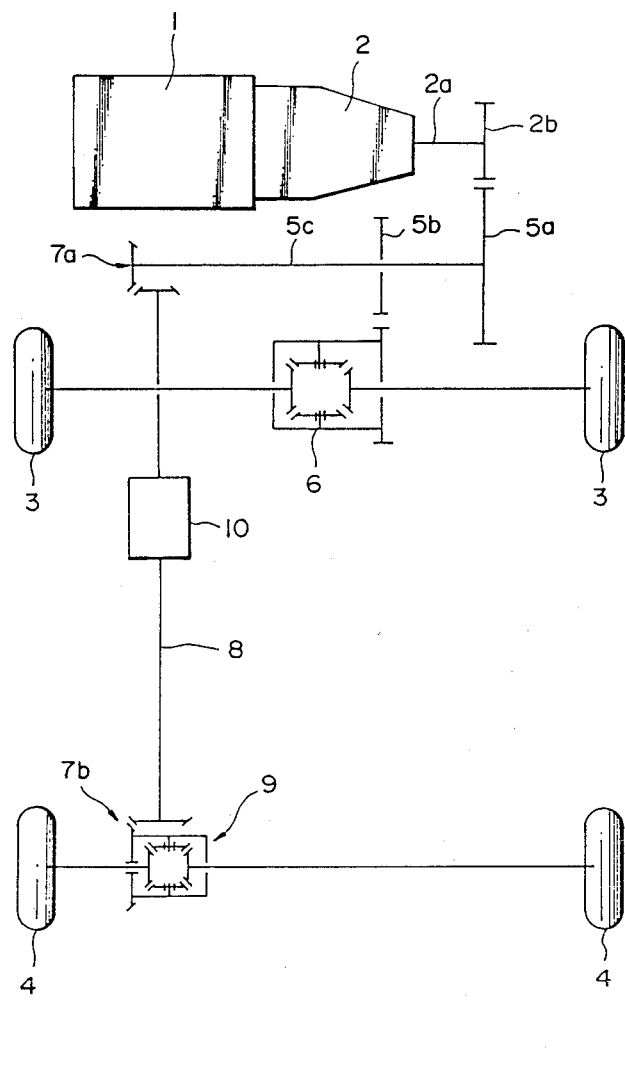
FIG. 3 is a diagrammatical view showing the general construction of a motor vehicle incorporating the drive coupling unit of the present invention.

The motor vehicle, as shown in FIG. 3, includes a transversely disposed engine 1 connected with a transmission 2 having an output shaft 2a on which a drive gear (or a fourth-speed counter gear) 2b is secured. Front wheels 3, 3 are connected together via a front differential unit 6 disposed therebetween. Likewise, rear wheels 4, 4 are connected together via a rear defferential unit 9 disposed therebetween. An intermediate shaft 5c is disposed between the engine 1 and the front differential unit 6 and a propeller shaft 8 is interposed between the intermediate shaft 5c and the rear differential unit 9.

The intermediate shaft 5c carries thereon a first gear 5a and a second gear 5b which are held in mesh engagement respectively with the drive gear 2b and a gear mounted on the outer periphery of the front differential unit 6. The intermediate shaft 5c is connected with the propeller shaft 8 via a bevel gear mechanism 7a. The propeller shaft 8 is further connected with the rear differential unit 9 through a bevel gear mechanism 7b.

The drive coupling unit 10 is disposed at an intermediate portion of the propeller shaft 8 and operatively connected with the propeller shaft 8 in such a manner that a front side portion of the propeller shaft 8 extending forwardly (upwardly in FIG. 3) from the drive coupling unit 10 is connected with the second driving shaft 8B of the rotor 12 and a rear side portion of the propeller shaft 8 extending rearwardly (downwardly in FIG. 3) from the drive coupling unit 10 is connected with the first driving shaft 8A of the cam ring 11. Alternatively, the front and rear side portions of the propeller shaft 8 may be connected to the first and second rotating shafts 8A, 8B, respectively.

The thus constructed drive coupling unit 10 operates as follows. When the first and second rotating shafts 8A, 8B while being driven create therebetween a difference in rotational speed, the rotor 12 rotates relative to the cam ring 11 whereupon the vanes 17 slide along the cam ring 11 to thereby force or drive the working oil in the individual pump chambers 21-23 into operation.

In this instance when the rotor 12 rotates counterclockwise in FIG. 1, the vaes 17 drive or force the working oil in the pump chambers 21-23 into operation. Consequently, the intake/discharge ports 21a, 22a, 23a which are disposed ahead of the vanes 17 serve as discharge ports in the discharge side compartment, whereas the intake/discharge ports 21b, 22b, 23b which are disposed at the rear of the vanes 17 serve as intake ports in the intake side compartments.

Owing to the pumping action of the vaes 17, the working oil is supplied from the respective intake/discharge ports 21a-23a, now serving as discharge ports 21a-23a, through the corresponding oil passages 32a-32c into the pressure chamber 20, as indicated by arrows in FIG. 1, thus urging the vanes 17 into abutment with the cam ring 11 at a predetermined force or pressure.

During that time, in each of the pump chambers 21-23, the working oil flows from the discharge side compartment to the intake side compartment through the orifice 27.

The working oil as it flows through the orifice 27 is subjected to a resistance which varies with the amount of flow of the working oil passing therethrough. The flow resistance acts in a direction to prevent relative rotation between the rotor 12 and the cam ring 11.

The rotor 12 and the cam ring 11 are therefore controlled by the action of the working oil in such a manner as to reduce a difference in rotational speed between them. Accordingly, when the cam ring 11 tends to rotate in excess relative to the rotor 12, a portion of the rotating torque is then transmitted to the rotor 12 via the working oil.

While the drive coupling unit 10 is in operation, the working oil is continuously supplied for lubrication to various movable components such as the bearings 43, 44, the piston 39, the rotor 12 and the vanes 17.

Thus, the drive coupling unit 10 serves to transmit the torque from the engine 1 to the front wheel side and the rear wheel side at an adequate torque distribution ratio so as to enable the front wheels 3, 3 and the rear wheels 4, 4 to continuously rotate substantially at the same speed. A four-wheel driving mode operation is thus achieved.

In the normal cruising condition where the slip of the front wheels 3, 3 is very small, the driving torque from the engine 1 is transmitted mainly to the front wheel side, while at the same time it occurs little or substantially no torque transmission to the rear wheel side. On the other hand, the slip of the front wheels 3, 3 becomes large when the vehicle is running on a low friction surface such as a sandy land. In this instance, the torque from the engine 1 is trarsmitted to the front wheel side and the rear wheel side at a proper torque distribution ratio. With this torque distribution, the slip of the front wheels 3, 3 in reality is restricted to the least. As a consequence, the vehicle while being driven by its four wheels is capable of running stably on such low frictional road surface without causing undue slip of the front wheels 3, 3.

While the drive coupling unit 10 is in motion, the working oil may leak from seal portions such as the seal members 45. Such leakage can be taken up by a supplementary supply of working oil from the tank 30a to the respective pump chambers 21-23 through the oil passages 24a, 25a, 24b, 25b, 24c 25c which extends respectively over very short distances between the tank 30a and the intake/discharge ports 21a-23b in the pump chambers 21-23.

Since each of the short oil passages 24a-25c is provided for one of two intake/discharge ports 21a-23b in each respective pump chamber 21-23, the amount of working oil retained in the respective oil passages 24a-25c is small. Furthermore, the oil passages 24a-25c are very short and hence the working oil as it flows through such very short passages 24a-25c is subjected only to a very small flow resistance, thus enabling the use of oil passages 24a-25c of a very small diameter. The check valves 33a-34c which are disposed in such small-diameter oil passages 24a-25c can be constructed in a compact size.

The compact check valves 33a-34c is operative in immediate response to a change in direction of the flow of the working oil which takes place when the direction of rotation of the rotor 12 relative to the cam ring 11 is reversed. With these quick-responsive check valves 33a-34c, the pressure chamber 20 is always maintained under a certain predetermined pressurized condition, which results in an improvement in the performance of the drive coupling unit 10.

Furthermore, with the use of the oil passages 24a-25c of reduced length and the compacted check valves 33a-34c, the overall size of the drive coupling unit 10 is substantially reduced.

The temperature of the working oil which is retained inside the drive coupling unit 10 such as the tank 30a and the pump chambers 21-23, varies with the operating condition of the drive coupling unit 10 between two extreme states appearing when the unit is stopped and while the unit is in operation. The working oil temperature varies also with a change in ambient temperature. A change in temperature of the working oil causes a change in pressure of the working oil. For instance, when the temperature of working oil becomes high, the pressure of the working oil is increased, tending to expand the volume of the working oil. Conversely, the pressure of the working oil is lowered as the temperature drops, thus contracting the volume of the working oil.

When a volumetric change of the working oil appears, the volumetric change take up mechanism 14 will operate to take up or cancel out such volumetric change, thereby maintaining the pressure of the working oil within a predetermined range.

Stated more specifically, when the working oil tends to expand under a highly pressurized condition, the piston 39 is retracted against the force of the spring 40. With this retracting movement, the effective length and hence the capacity of the axial hole 13b is increased, thereby allowing the expansion of the working oil. Conversely, when the working oil tends to contract with a pressure drop, the piston 39 is urged forwardly toward the end of the axial hole 13b, thus reducing the effective length and hence the capacity of the axial hole 13b. As a result, the contraction of the working oil is cancelled out.

With this volumetric change take up mechanism 14, the drive coupling unit 10 is operative reliably without causing a sealing failure which would otherwise result in objectionable extrusion of the working oil from the seal portions of the drive coupling unit 10 or intrusion of the outside air in the drive coupling unit 10.

The volumetric change take up mechanism 14 is disposed near the axis of rotation of the rotor 12. This arrangement is effective to prevent a pressure drop which would otherwise occur in the vicinity of the central axis of the rotor 12 when the rotor 12 is rotated.

In immediate response to such pressure drop, the piston 39 of the volumetric change take up mechanism 14 moves forwardly to reduce the effective volume or capacity of the tank 30a with the result that a pressure drop in the vicinity of the central axis of the rotor 12 does not take place any more.

A further advantage of the drive coupling unit 10 is that the tank 30a disposed along the outer priphery of the unit 10 is highly effective to cool the working oil.

Figure 4:
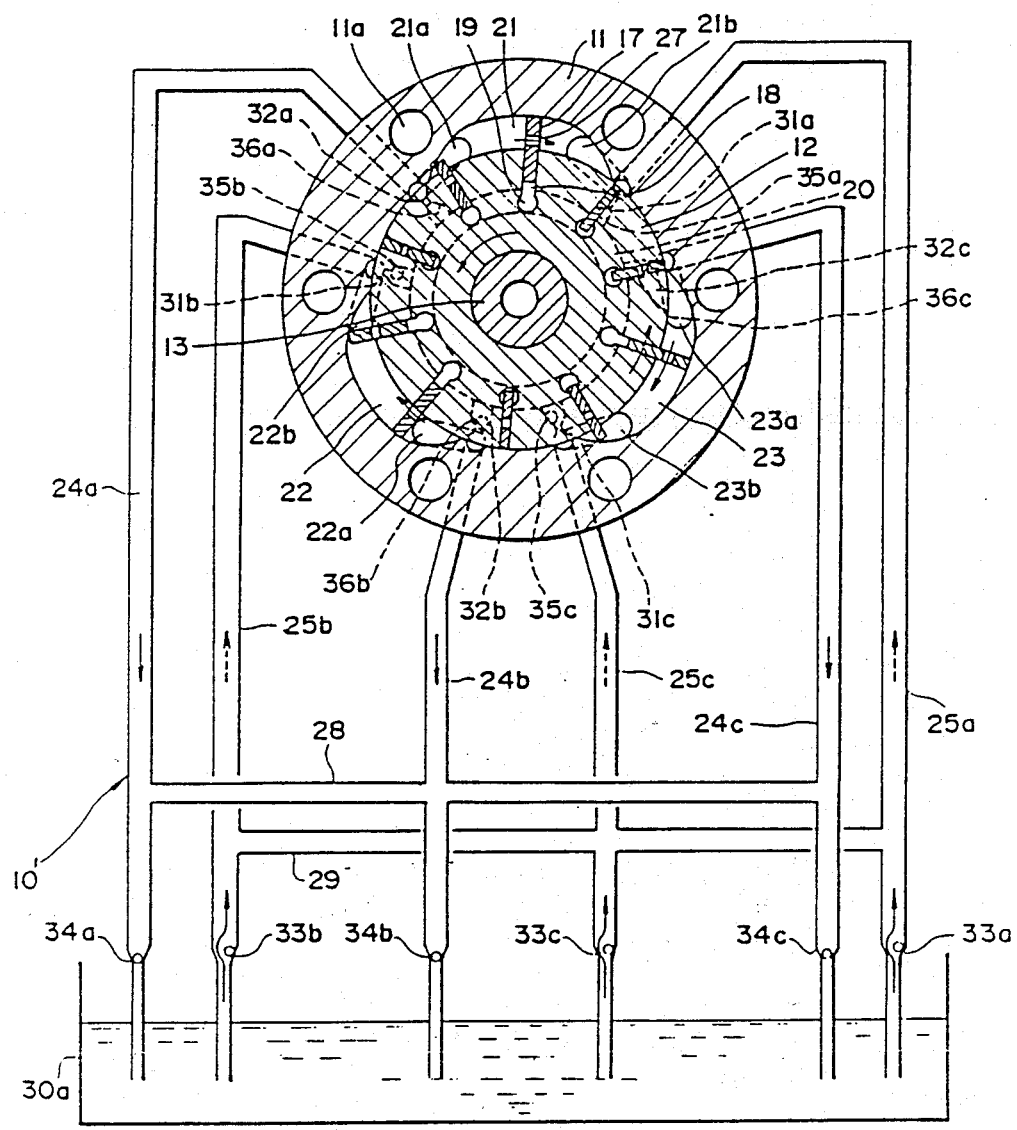
FIG. 4 is a view similar to FIG. 1, but showing a modified drive coupling unit according to a second embodiment.

FIG. 4 shows a second embodiment of the drive coupling unit according to the present invention The drive coupling unit 10' is constructed such that those intake/discharge ports which constitute intake ports in the respective pump chambers 21-23 are intercommunicated with each other through a connecting passage 28 or 29, and the remaining intake/discharge ports which constitute discharge ports in the respective pump chambers 21-23 are intercommunicated with each other through a connecting passage 29 or 28.

The drive coupling unit 10' includes, in the same manner as the drive coupling unit 10 of the foregoing embodiment, a total of six oil passages (working fluid supply passages) 24a-25c each connecting one of two intake/discharge ports 21a-23b in each respective pump chamber 21-23 with the tank 30a. The oil passages 24a, 24b, 24c are interconnected by the connecting passage (oil passage) 28 while the oil passage 25a, 25b, 25c are interconnected by the connecting passage (oil passage) 29. The oil passages 28, 29 are connected at portions of the respective oil passages 24a-24c 25a-25c which are disposed on one side of the check valves 33a-33c, 34a-34c close to the pump chambers 21-23.

Other structural details of the drive coupling unit 10 are the same as those of the drive coupling unit 10 and hence no description is necessary.

The function of the drive coupling unit 10' and advantageous effects attained thereby are substantially the same as those of the unit 10 of the first embodiment. The unit 10', however, further has a peculiar function and advantages attained thereby, as described below.

In a unit of this type, it is preferable to arrange the vanes 17 in such a manner that at least one vane 17 is always disposed in each of the pump chambers 21-23 so as to continuously drive the working oil into operation. To this end, the number of the vanes 17 is generally greater than the number of the pump chamber 21-23 by a predetermined number. The number of the vanes 17 appearing in each pump chamber 21-23 varies with the phase of the individual vanes 17, as shown in FIGS. 5(a) and 5(b).

In the illustrated embodiment, the number of the pump chambers 21-23 is three whereas the number of the vanes 17 is ten. Each pump chamber 21-23 may have only one vane 17 as shown in FIG. 5(a) or alternately it may have two vanes 17 as shown in FIG. 5(b).

Since each of the vanes 17 has one orifice 27, the pump chamber 21-23 may have a single orifice when receiving one vane 17, or a double orifice when receiving two vanes 17.

Figure 5A:
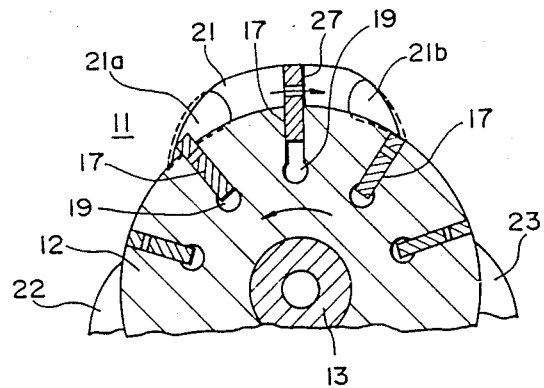
FIGS. 5(a) and 5(b) are fragmentary diagrammatical views illustrative of the operation of the modified drive coupling unit.
Figure 5B:
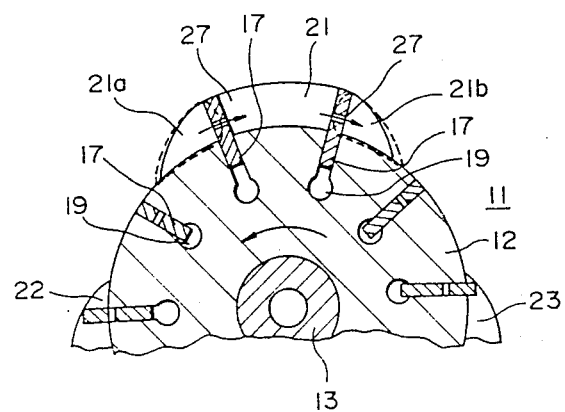
Figure 6:
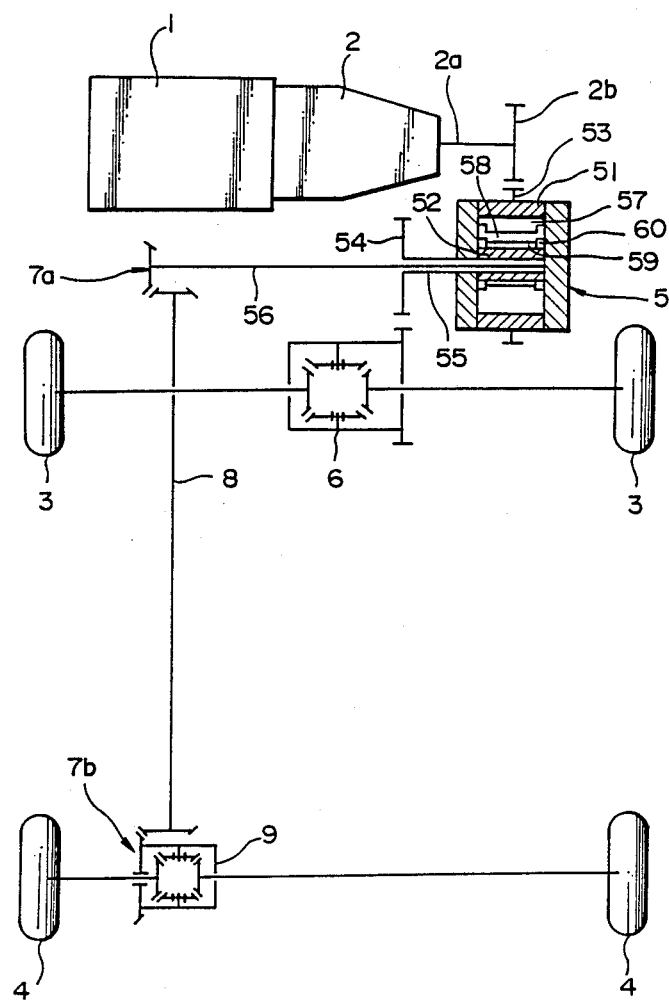
FIG. 6 is a view similar to FIG. 3, but showing a motor vehicle incorporating a conventional drive coupling unit.
Figure 7:
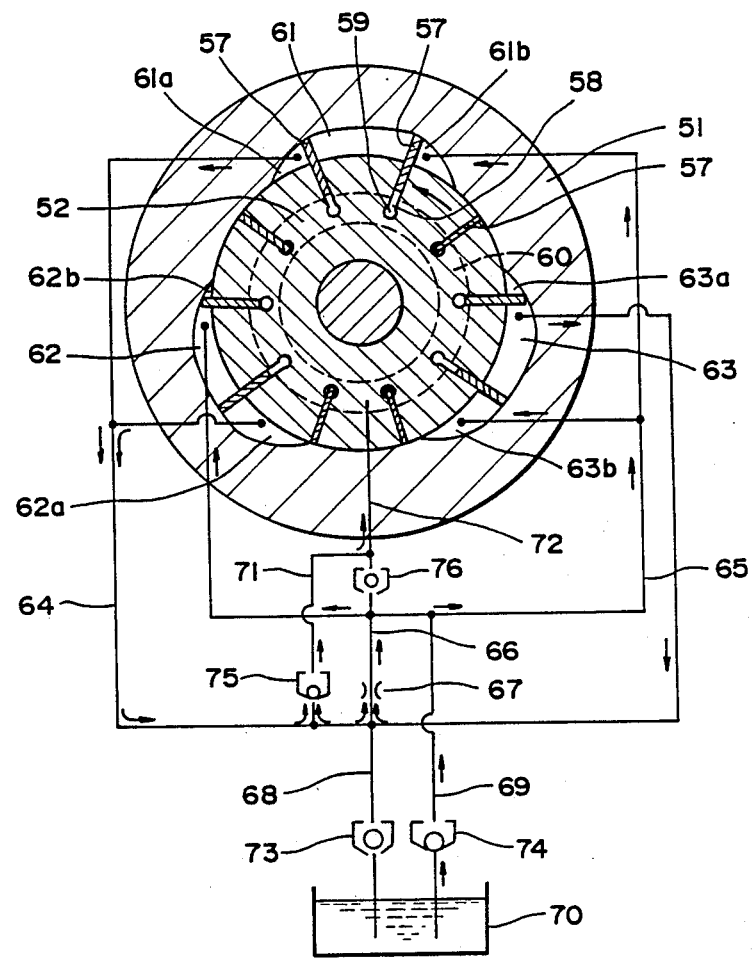
FIG. 7 is a diagrammatical view illustrative of an arrangement of working fluid flow passages in the conventional drive coupling unit.
Figure 8:
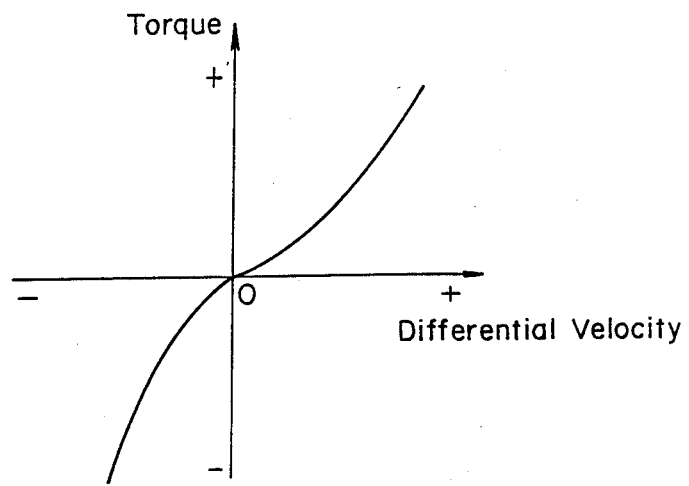
FIG. 8 is a graph showing the torque transmitting characteristic of the conventional drive coupling unit.

When the rotor 12 is rotated counterclockwise relative to the cam ring 11 as indicated by the arrow shown in FIGS. 5(a) and 5(b), the vanes 17 are turned counterclockwise while at the same time the working oil is moved rightward relative to the vanes 17. The thus displaced working oil is however allowed to move rightward only through the orifice 27 provided in each vane 17. Most part of the working oil is forced leftward by the vane 17, so the intake/discharge port 21a disposed leftward in FIGS. 5(a) and 5(b) constitutes a discharge port and the righthand intake/discharge port 21b constitutes an intake port.

As appears from the foregoing description, the driving force exerted on the working oil through the double orifice is greater than the driving force excerted on the working oil through the single orifice.

As the number of the vanes 17 appearing in the pump chamber 21 varies with a change in phase of the vanes 17, the intake and discharge pressure of the working oil varies periodically. Further, the discharging quantity of the unit 10' also varies depending on a change in the speed of the vanes 17 as they move across the discharge port 21a. With this varying pressure and discharge, the torque output (to be transmitted to the rear wheel side) and the axial load fluctuate which may produces undesired vibration and noise in a transmission system.

In the arrangement in which each individual intake/discharge port 21a-23b in one pump chamber 21-23 is connected to the tank 30a through one oil passsage 24a-25c, the discharge ports or the intake ports are fluidly independent of each other and hence the working oil is likely to cause a pressure fluctuation.

Such pressure fluctuation can substantially be eliminated by the drive coupling unit 10' in which the intake/discharge ports acting as intake ports are interconnected by the connecting passage 28 or 29, and the intake/discharge ports acting as discharge ports are interconnected by the connecting passage 29 or 28. With the thus-provided connecting passages 28, 29, either group of intake/discharge ports interfere with each other to thereby equalize the intake pressure or the discharge pressure over the ports.

The drive coupling unit of the second embodiment has various advantages: the performance of the unit is substantially improved by the provision of the high-responsive check valves 33a-34c. The unit is free from pressure fluctuation and hence hence is operative without producing undesired vibration and noise in the transmission system. The oil passages 24a-25c are vary short in length and small in diameter and the check valves 33a-34c disposed therein are small in size. With these compact components, the unit 10' is compact as a whole.

Although the connecting passages 28, 29 in the illustrated embodiment are arranged to interconnect the oil passages 24a-24c 25a-25c, it is possible to arrange these connecting passages 28, 29 for interconnecting the corresponding intake/discharge ports.

The drive coupling unit 10, 11 may be disposed at any of the shafts other than the propeller shaft 8. Furthermore, the unit 10, 11 may be incorporated in any unit other than the automobile four-wheel drive unit.

The working oil used as a working fluid may be replaced with another kind of fluid.

Obviously, various modifications and variations of the present invention are possible in the light of the above teaching. It is therefore to be understood that within the scope of the appended claims the invention may be practiced otherwise than as specifically described.

What is claimed is:

1. A drive coupling unit comprising:

a cam ring connected to a first rotating shaft;

a rotor connected to a second rotating shaft and rotatably disposed in said cam ring so as to define therebetween a plurality of pump chambers;

a multiplicity of sliding vanes mounted on an outer peripheral surface of said rotor and slidably engaging an inner Peripheral surface of said cam ring so as to divide each of said pump chambers into a discharge side compartment having a discharge port and an intake side compartment having an intake port;

a working fluid filled in said pump chambers for being compressed in said discharge said compartment and then circulated into said intake side compartment in each of said pump chambers as said cam ring and said rotor are rotated relative to one another due to a difference in rotational speed between said first rotating shaft and said second rotating shaft;

an orifice disposed in a working fluid flow passage interconnecting said discharge side compartment and said intake side compartment in which of said pump chambers;

a tank storing therein said working fluid;

a pair of working fluid supply passages extending between said tank and each said pump chambers, said pair of working fluid supply passages including a discharge fluid supply passage connected to a corresponding one of said discharge ports and an intake fluid supply passage connected to a corresponding one of said intake ports, for selectively supplying said working fluid therethrough from said tank; and a check valve disposed in each of said working fluid supply passages, whereby each said intake/discharge port is communicated with said tank through a corresponding one of said working fluid supply passages and a corresponding one to said check valves.

2. A drive coupling unit according to claim 1, wherein those intake/discharge ports which constitute intake ports in the respective pump chambers are connected together by a first connecting passage, and the remaining intake/discharge ports which constitute discharge ports in the respective pump chambers are connected together by a second connecting passage.

* * * * *